United States Patent [19]
Gitman et al.

[11] Patent Number: 5,123,364
[45] Date of Patent: Jun. 23, 1992

[54] METHOD AND APPARATUS FOR CO-PROCESSING HAZARDOUS WASTES

[75] Inventors: Gregory M. Gitman, Duluth; Frederick J. Kuntz, Tucker, both of Ga.

[73] Assignee: American Combustion, Inc., Norcross, Ga.

[21] Appl. No.: 502,561

[22] Filed: Mar. 30, 1990

Related U.S. Application Data

[63] Continuation-in-part of Ser. No. 434,018, Nov. 8, 1989, Pat. No. 5,005,493.

[51] Int. Cl.$^5$ .............................................. F23G 7/06
[52] U.S. Cl. ................................. 110/346; 110/210; 110/212; 110/233; 110/188; 432/14
[58] Field of Search .............. 110/185, 346, 236, 233, 110/210, 212, 188; 432/14, 72, 105

[56] References Cited

U.S. PATENT DOCUMENTS

4,815,398  3/1989  Keating, II et al. ............ 110/236 X
4,974,528  12/1990  Barcell ............................. 110/236 X

*Primary Examiner*—Edward G. Favors
*Attorney, Agent, or Firm*—Needle and Rosenberg

[57] ABSTRACT

A method of thermal decontamination of organic wastes in which the waste is treated in a primary incinerator by a heat source such that solid residue is collected from the incinerator and exhaust fumes then participate in an industrial thermal process by being directed to an industrial containment by combusting the exhaust gases together with fuel and an oxidizer with oxygen concentration in excess of air to decontaminate the exhaust gases and using the heat produced in the industrial process.

20 Claims, 3 Drawing Sheets

METHOD AND APPARATUS FOR CO-PROCESSING HAZARDOUS WASTES

This application is a continuation in pat of a U.S. patent application Ser. No. 07/434,018 filed Nov. 8, 1989 now U.S. Pat. No. 5,005,493.

BACKGROUND OF THE INVENTION

The present invention relates to a method and apparatus for co-processing hazardous wastes.

Many industrial furnaces use burners for combustion of fuel with air to produce a high temperature flame which is used as an energy source for heating, melting and other industrial processes. These industrial furnaces often provide retention time at temperatures which are compatible with conditions desired for decontamination of hazardous components exhausted from different industrial processes and from primary incinerating chambers of industrial and/or hazardous waste incinerators. In addition, many industrial furnaces are equipped with bag houses and scrubbers to clean the exhaust gases after thermal treatment to remove hazardous constituents.

Historically, industrial furnaces, and particularly cement kilns, have been used to co-process waste fuel streams which are fed into the furnace to provide part of the heat required for the process. Any inorganic components of the waste fuel stream are discharged as components of the exhaust gases or become mixed with the product produced within the industrial furnace. This contamination of the products produced in industrial co-processing furnaces limits the volume and chemical composition of wastes which can be processed in this manner. Slagging combustion chambers have been attached to industrial boilers to permit some liquid waste containing a small amount of inorganics to be incinerated. Hot combustion product generated from the burning of liquid wastes are separated from inorganic residue in these slagging combustion chambers prior to the hot gases being discharged into industrial boilers through a dedicated opening in the boiler wall. This provides for the heat released from such burning to be recovered in the boiler and for the inorganic residue stream to be slagged and discharged from the slagging combustor, thereby preventing significant introduction of inorganic ash into the boiler. In cement kilns and large boilers. Liquid fuel is typically mixed with clean fuel prior to burning and homogenized to insure a consistent caloric value, viscosity and other characteristics. Solid high BTU wastes, such as automobile tires, may also be co-processed after they are shredded and injected into furnaces which are designed to burn solid fuels. The technologies described above have been designed to use a portion of the heat made available from the burning of a waste stream inside of the co-processing industrial furnace. This heat recovery permits a reduction in the firing of expensive clean fuel which would be required to maintain the industrial process.

Significant effort is now being expended on the treatment of solid wastes, such as contaminated soils, from sites such as leaking underground storage tanks. A significant portion of this decontamination will be accomplished by treating soil in portable or stationary incinerating chambers. The remediation of this contaminated soil can be accomplished with significantly less expense if existing industrial furnaces can be used to co-process such wastes.

Presently methods and apparatus for co-processing wastes are not suitably designed to process solid wastes. These wastes cannot be charged into industrial furnaces without upsetting the quality of the products being produced due to their low caloric value and the large volumes of residues which remain after decontamination. Currently, several attempts have been made to modernize existing cement kilns to accept contaminated flue gases delivered by a dedicated flue duct which directs these flue gases to the cement kiln. These contaminated flue gases are fumes derived from an auxiliary incinerating chamber designed as a rotary kiln to treat contaminated soil by a fuel/air burner firing inside of the rotary kiln.

Problems exist, however, with the ability of such cement kilns to accept contaminated flue gases. These cement kilns have exhibited a decline in the quality of the products produced, a decrease in heating efficiency, a loss of control over the levels of excess oxygen and combustibles at the kiln exhaust, and poor temperature distribution inside of the kiln. Such problems have made the presently known approach economically unattractive and environmentally risky for the treatment of the majority of hazardous wastes

SUMMARY OF THE INVENTION

The object of the present invention is to provide a method and apparatus for the thermal decontamination of hazardous wastes while using industrial furnaces for the decontamination of fumes exhausted from the thermal decontamination process without a decline in the performance of the industrial furnace and without compromising a clean environment.

The method of industrial furnaces for co-processing of hazardous wastes according to the present invention comprises a first step of charging contaminated waste into a primary incinerating chamber equipped with auxiliary combustion means using a primary oxidizing gas preferably containing at least a fraction of an oxygen rich stream with an oxygen content above 21%. The primary incinerating chamber is used to dry and heat the solid waste to high temperatures in order to volatilize the organic components of the waste and decontaminate the solid residue. This decontamination process generates high temperature exhaust fumes which may contain a quantity of hazardous components and which are directed toward the industrial furnace. These high temperature exhaust fumes are introduced into a combustor installed through the wall of the industrial furnace.

The present method further includes the additional step of supplying the combustor with a controllable amount of fuel and controllable amounts of a secondary gaseous oxidizer including at least one oxygen rich stream with an oxygen concentration higher than the oxygen content of air. The fumes, fuel and oxidizing gases are mixed to create a flame envelope directed toward the industrial furnace interior. Measurements are taken of at least one process parameter necessary to control the quality of the product produced in the industrial furnace. The measurement is compared with a desired optimum value for the process. The process parameter is maintained close to the desired process value by changing the flow of fuel and/or the amount of oxygen ad nitrogen provided to the process while still allowing the entire flow of flue gases to be directed into the industrial furnace. The method may further include the step of measuring at least one process parameter necessary to control a sufficient level of system pressure in the primary incinerating chamber to prevent a discharge of hazardous gases into the environment. Furthermore, the method may include the step of controlling at least one process parameter necessary to provide for thermal decontamination of solid residue being discharged from primary incinerating chamber.

DESCRIPTION OF INVENTION

According to the method of the present invention, primary incinerating chambers, such as rotary kilns, fixed hearth or others, are used for the combustion of an auxiliary fuel with the primary gaseous oxidizer to dry and preheat low BTU waste streams to a temperature at which organic components of the waste are volatilized, thermally pyrolyzed and/or partially oxidized. The remaining organic components are then further exhausted as a part of the gaseous fumes which are discharged via an insulated duct from the primary incinerating chamber. These fumes are further directed toward an industrial furnace for co-processing. Optionally, a hot cyclone can be installed downstream of the primary incinerating chamber and upstream of the industrial furnace to process the fumes to reduce the amount of entrained solid particles. Also optionally, the fume may be directed through an afterburner chamber fired with auxiliary burners to increase temperature and reduce the amount of combustibles and undesirable hazardous organic components in the fumes upstream of the industrial furnace. When fumes are delivered to an industrial furnace, at least part or the entire fume stream is first directed to a combustor installed through the wall of the industrial furnace and further through the combustor toward the furnace interior. Simultaneously, secondary fuel is directed through the combustor, preferably in at least one stream surrounded by the fume stream. At the same time, a secondary oxygen rich oxidizer is directed toward the combustor to mix with the fuel and the fume stream inside of flame envelope formed by combustion of the fuel mixture, oxidizer gas and fume combustible components.

A process controlling device, preferably a thermocouple, is used to measure temperature inside the industrial furnace interior and a temperature controller is preferably used to compare furnace temperature with a temperature set point required to satisfy industrial furnace process requirements. The temperature controller may further be used to control the flow of the fuel and secondary oxygen rich oxidizer to maintain the desired temperature inside of the industrial furnace.

The flow of a secondary oxidizer can be delivered to the combustor by a single stream of oxygen or oxygen enriched air or by two streams of oxidizing gases having different oxygen content, for example air and pure oxygen. Introduction of this secondary oxidizer through the combustor toward the flame envelope can also be accomplished as a single stream or two separate streams having different oxygen contents. Each of such streams can be introduced inside of the flame envelope as one or more gaseous jets. A similar primary gaseous oxidizer can be used at the primary incinerating chamber. An additional auxiliary stream of oxidizer can be directed towards the primary incinerating chamber interior and/or the industrial furnace interior by-passing flame envelopes directed into the interiors.

The amount of oxygen provided to the combustor with the secondary oxidizer can be controlled by several different methods or combination of methods to optimize flame performance and to control excess oxygen in the industrial furnace interior. For example, the amount of oxygen in flue gases leaving the industrial furnace may be continuously measured so that the amount of oxygen to be supplied by a secondary oxidizer can be determined and controlled. For example, two oxidizing gases may be used in such a fashion that the amount of the first oxidizing gas flow can be controlled to provide the desired stoichiometric ratio to combust the fuel and the second oxidizing gas flow can be controlled to provide the desired oxygen content in flue gases. Other control algorithms can be used to measure the flow of flue gases and the oxygen content in the flue gases leaving the industrial furnace. Based on these measurements, the amount of fuel and the flow of secondary oxidizer can be controlled to satisfy temperature and available heat requirements in the furnace and excess oxygen requirements in the flue gases. Several other control algorithms can be used to provide adequate oxygen mass flow inside of the oxidizer through anticipation and/or detection of the amount of combustible oxygen contained inside of the fume and/or flue gases leaving the industrial furnace. The use of the fumes as ballast gas for substitution of at least a part of the nitrogen of the combustion air is a central component of the present invention. The combustor and combustion control system should be designed to utilize exhaust fumes as ballast gas having varying amounts of combustibles, if any, and containing anticipated or measured amounts of oxygen.

An optional hot cyclone and afterburner may be installed downstream of the primary incineration chamber to condition the fume characteristics to an anticipated value prior to introduction into the combustor. Preferably, a hot gas transfer fan is used downstream of the primary incineration chamber and upstream of the industrial furnace for controlling system pressure inside the chamber and creating sufficient pressure at the combustor fume inlet to transfer the required fume volume. Also, different flow control logics can be used which should utilize the following basic rules: 1) the entire flow of fume gases should be directed through the industrial furnace wherein at least a fraction of these fumes should be directed through the combustor means; 2) oxygen rich gas should participate at least as a part of the primary and/or secondary oxidizer to provide the desired level of process performance; 3) the controllable fuel and secondary oxidizer flow should be maintained to insure the desired heat input to the industrial process; 4) the amount of oxygen in the oxidizer stream should be provided based on measured fuel flow and/or on the anticipated or measured amount of oxygen supplied with the fume flow and/or amount of oxygen discharged with the flue gases leaving the industrial furnace; 5) the controllable flow of primary fuel and primary oxidizer should be maintained to insure the required level of thermal destruction of solid residue being discharged from the primary incinerating chamber; and 6) the amount of oxygen and nitrogen provided with primary and secondary oxidizers should be controlled to maintain the required system pressure and discharge of fumes and contaminated combustion gases from primary incinerating chamber and the industrial furnace.

The wet or dry scrubber with or without a venturi temperature and particulate conditioning device may be used to cool fumes and to scrub acid gases prior to their introduction into the industrial furnace. An auxiliary bag house may also be used in some cases to reduce the amount of particulates introduced with the fumes into the industrial furnace.

In addition, the industrial furnace may be an air pollution control system and simultaneously be used to reduce the release of hazardous components exhausted from the thermal decontamination process conducted in the primary incinerating chamber. Such hazardous components may typically be duct CO, contaminated organic, NOx, other acid gases, heavy metals and their oxides, etc.

The major part of or the entire stream of fumes, when introduced into the industrial furnace, are placed into the flame wherein they play the role traditionally performed by the nitrogen of combustion air. Such substitution is made possible by the use of an oxygen rich oxidizing gas in the manner described in the present invention, which insures the performance of the industrial furnace used as an additional environmental cleaning device for exhaust gases from the primary incinerating chamber.

For example, the incineration of lead contaminated waste can be performed in a primary incineration chamber communicating with a lead smelter utilizing an oxygen rich oxidizer so that at least a part of the nitrogen contained in the combustion air used by the smelter burner can be substituted with fume exhaust from the primary incinerating chamber, thereby providing for lead recovery from the fumes.

Another example is the use of a rotary kiln for the thermal decontamination of low BTU soil with the discharge exhaust fume gases into a cement kiln. The fumes can be introduced through the flame of a burner used to provide heat to the process and exposed to the very high temperatures of the flame utilizing an oxygen rich oxidizer and further exposed to above 2200° F. of the cement kiln process for several seconds to insure complete thermal destruction of any hazardous organic components contained in the fumes.

The introduction of fumes into the interior of the industrial furnace through the flame pattern provides for the exposure of the fumes to flame treatment prior to their discharge into the furnace. This treatment provides for the exposure of the fumes to the hottest combustion zone existing inside of the flame utilizing an oxygen rich oxidizer.

Also, a process control method may be present for providing reliable operation of the furnace in spite of high variability of the flows and chemistry of the fume streams being discharged into the industrial furnace process. This control method provides for controllable amounts of fuel and a controllable amount of oxygen supplied with the oxygen rich oxidizer in a manner which allows the continuous adjustment of the heat available for the industrial furnace process which is dependent on two simultaneous sets of process parameters. The first set of process parameters relates to the process conducted in the industrial furnace and the second set of parameters relates to the process conducted in the primary incinerating chamber. The control algorithm used to provide for the supply of controllable amounts of fuel and oxygen rich gas to the industrial furnace combustors is continuously effected by the flows and chemistry of the stream of fumes being introduced through the flame pattern of the combustor. This method of fume introduction is used to enhance decontamination efficiency, however, this fume introduction method creates dynamic variation in flame temperatures, heat availability, excess oxygen levels in the flue gases leaving the industrial furnace and other process characteristics. The flame, serving an active role as an energy source for the process conducted in the industrial furnace, should change dynamically the controllable flows of fuel and a secondary oxidizer to provide characteristics able to satisfy the requirements of the industrial process and at the same time to insure reliable decontamination of the fumes.

A critical parameter of operation which should be satisfied is the primary incinerating chamber pressure. The present co-processing system should implement pressure control to prevent leaks of contaminated fumes from the primary incinerating chamber and also from the industrial furnace containing contaminated gases.

Another feature of the control algorithm is the control of the feed rate of the waste stream based on at least one continuously measured technical parameter of the process conducted in the industrial furnace. This technical parameter can be the level of system pressure in the industrial furnace or another parameter which correlates with furnace pressure. One or more additional process parameters responsible for consistent product quality should be used to provide input to the process system responsible for the control of the instantaneous flows of a secondary fuel and secondary oxidizer to the industrial furnace. Both the primary and secondary oxidizer should preferably be capable of adjusting the level of nitrogen provided with these gases in order to provide the industrial furnace with good process control and heating efficiency. This will provide for the flexible control of the flame parameters in response to process upsets and in response to changes in the waste stream or in the products produced in the industrial furnace. Preferably, the use of air as one part of oxidizers and oxygen as the other part of oxidizers can provide the required flexibility. These two gases can be premixed and/or separately delivered into the combustion chambers of the combustion devices operated at the industrial furnace and/or in the primary incinerating chamber. The amount of ballast nitrogen being delivered to the process can be preferably adjusted by control of the oxygen/air ratio while providing the total amount of oxygen needed to satisfy requirements for the level of excess oxygen in the flue gases leaving the industrial furnace. The control of the level of ballast nitrogen being introduced into the process at the primary incinerating chamber and/or at the industrial furnace can be adjusted to prevent the loss of system pressure control at the primary incinerating chamber and/or at the industrial furnace.

Controllable flows of water or aqueous waste may be introduced into the primary incinerating chamber to slow down the heating, the thermal pyrolysis and combustion in order to correct the flow and the chemistry of the fumes derived from the incinerating chamber. Similar injection can be implemented at the industrial furnace to provide additional heat sink to maintain the desired temperature in the industrial furnace when the pace of product charging into the furnace mismatches the level of heat input needed to insure the complete decontamination of incoming fumes while supplying the industrial process.

APPARATUS

Figure 1:
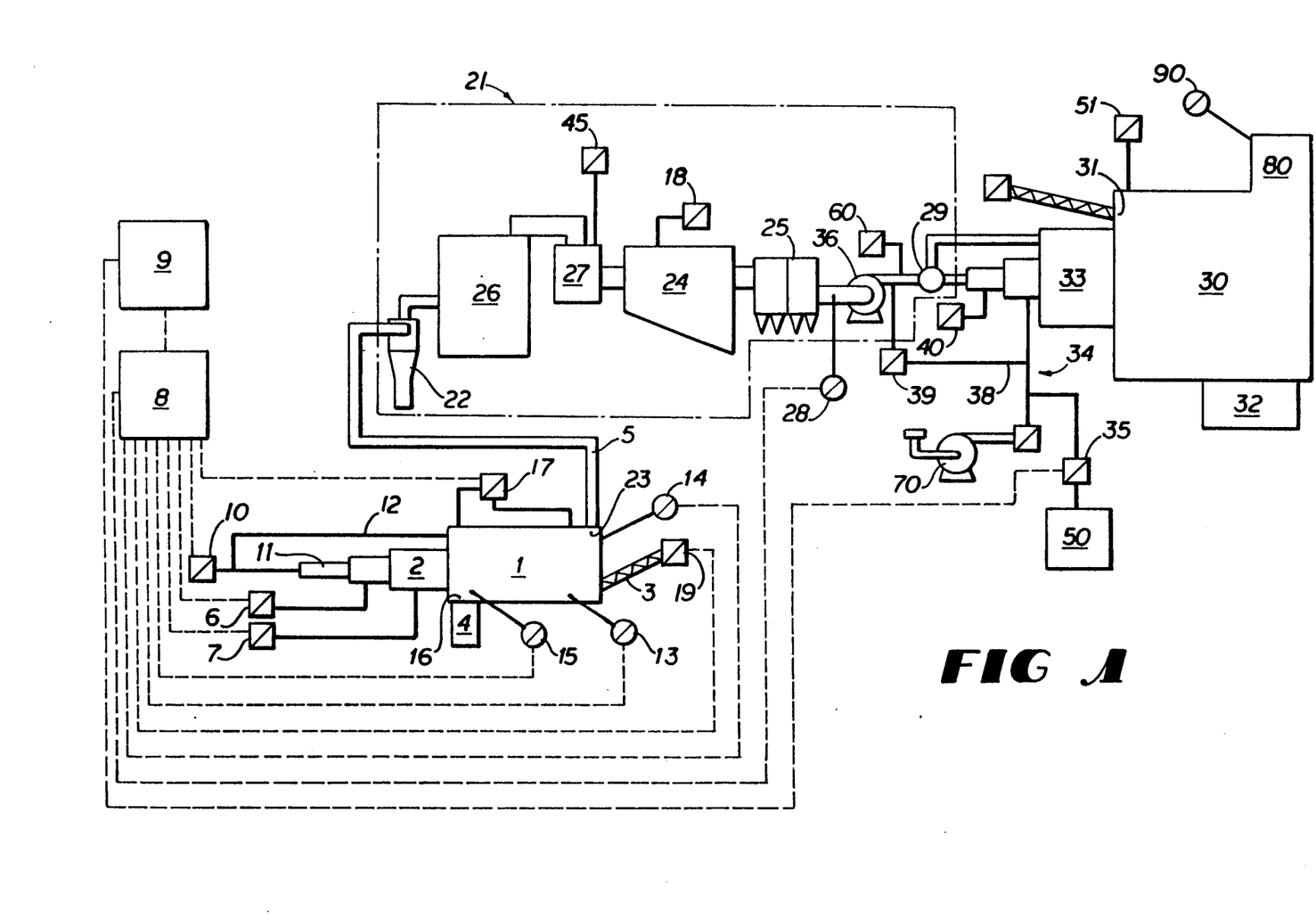
FIG. 1 is a process schematic of a first preferred embodiment of the present invention.

FIG. 1 shows a first embodiment of the present invention having of a primary incinerating chamber 1 designed as a rotary kiln for solid waste incineration and containing an auxiliary burner 2; a solid waste feeder 3; a solid residue receiver means 4; a flue duct 5 for evacuation of exhaust gases from the primary incinerating chamber 1; auxiliary fuel flow control means 6; primary oxidizer flow control means 7; an electrical control panel 8 communicating with the flow control means 6 and 7; and also with feeder control means 9. Optionally, an additional oxidizer supply means 10 can be installed to direct a controllable flow of an additional oxidizer in the primary incinerating chamber 1 exterior through injector means 11 and/or 12. Preferably, a pressure transducer means 13 can be installed at one or both kiln ends to measure the primary incinerating chamber pressure and to communicate it to process control means 8. Also, temperature sensing devices, such as thermocouples or infrared pyrometers 14 and 15 may be installed through one or both of the end walls of the rotary kiln 1 to sense the temperature correlating with the temperature of the exhaust gases and/or solid residue at the discharge end 16 of the chamber 1.

An exhaust gas volume measuring means 60 may preferably be included to identify the exhaust fume volume being transported to an industrial furnace 30. Aqueous waste injector means 17 can be installed through one or both end walls of the chamber 1 to inject a controllable stream of aqueous waste or water in the chamber 1 interior to improve temperature distribution control inside of the primary incinerating chamber 1. This embodiment also includes a communication link between the control means 8 and all temperature sensing devices and devices responsible for flow control of the additional oxidizer, aqueous waste and/or water being injected, and the pace of the solid waste charging.

The first embodiment invention also includes of an industrial furnace 30, an industrial incoming product charging opening 31, an industrial product discharging opening 32, combustor means 33, and secondary oxidizer supply means 34 containing flow control means 35 communicating with process control means 9. Preferably, the secondary oxidizing supply means 34 contains an oxygen rich gas supply source such as liquid oxygen storage or a PSA oxygen plant 50 and combustion air supplied by blower 70. A supply line 38 is used to supply a controllable amount of an additional oxidizer throughout flow control means 39 to the industrial furnace 30. Industrial furnace 30 also consists of means 40 for supplying a controllable amount of fuel to the combustor 33 and a connecting fume duct 21 for supplying the entire flow of exhaust gases from the primary incineration chamber exhaust duct 5 to the industrial furnace 30. Optionally, this connecting duct 21 includes hot cyclone 22 to remove particulates which are contained in the exhaust fumes leaving the primary incinerating chamber 1 through exhaust opening 23. The connecting fume duct 21 may also include afterburner means 26 to afterburn the fume exhaust to reduce the amount of combustibles in the fumes delivered to the combustor means 33. Optionally, venturi temperature conditioning means 27 may be installed as a part of the connecting duct 21 to reduce the temperature of the fumes by high pressure aqueous injection 45. Also, optionally, a wet or dry scrubber 24 may be installed as part of the connecting fume duct 21. Scrubbing fluid is supplied by control means 18 into device 24. A bag house 25 can also be installed as a part of fume duct 21 to further reduce particulates contained in fumes received by combustor 33.

Preferably, an oxygen and/or CO and/or combustibles analyzing means 28 is provided to analyze oxygen and/or combustibles contents in flue gases leaving the primary incinerating chamber 1 and/or the industrial furnace throughout exhaust opening 80. This analyzer means 28 is connected to process control means 8. Preferably, an oxygen and/or CO and/or combustible analyzer means 90 should be installed to analyze oxygen and/or combustible contents in flue gases leaving the furnace through exhaust opening 80.

Connecting fume duct 21 may contain an optional auxiliary bypass duct 29 for directing a part of the fumes to industrial furnace 30 bypassing combustor means 33. Connecting fume duct 21 also includes of a fume moving means 36 such as a hot blower or an eductor utilizing a high pressure stream such as air, oxygen, or oxygen enriched air. The moving means is used to exhaust fumes from the primary incinerating chamber 1 and to move the fumes toward industrial furnace combustor means 33. Aqueous waste or water injecting means 90 can be preferably installed at the industrial furnace 30 to provide improved control over temperature distribution inside the industrial furnace.

Figure 2:
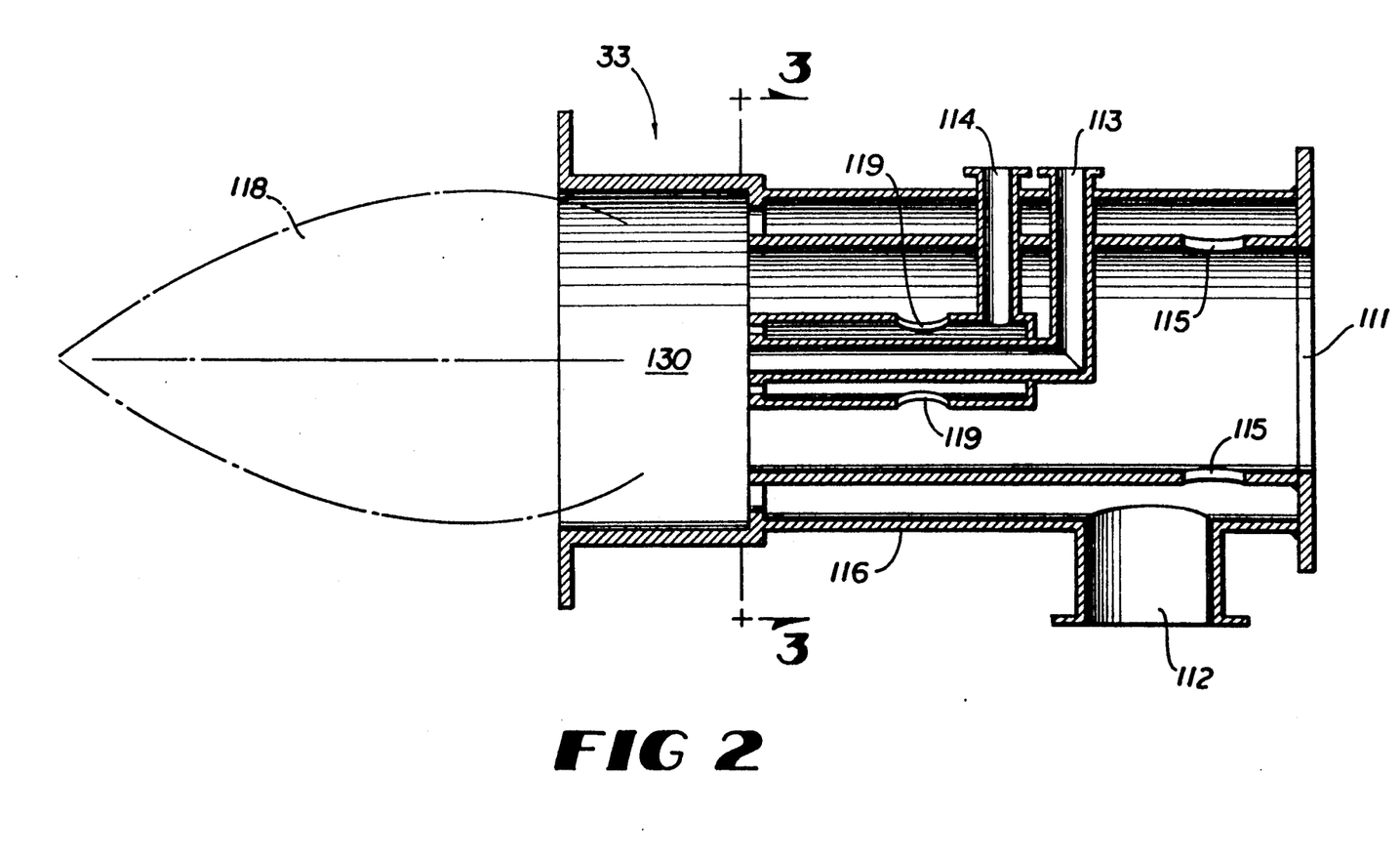
FIG. 2 is a schematic of an apparatus designed for use with the first preferred embodiment of the present invention.
Figure 3:
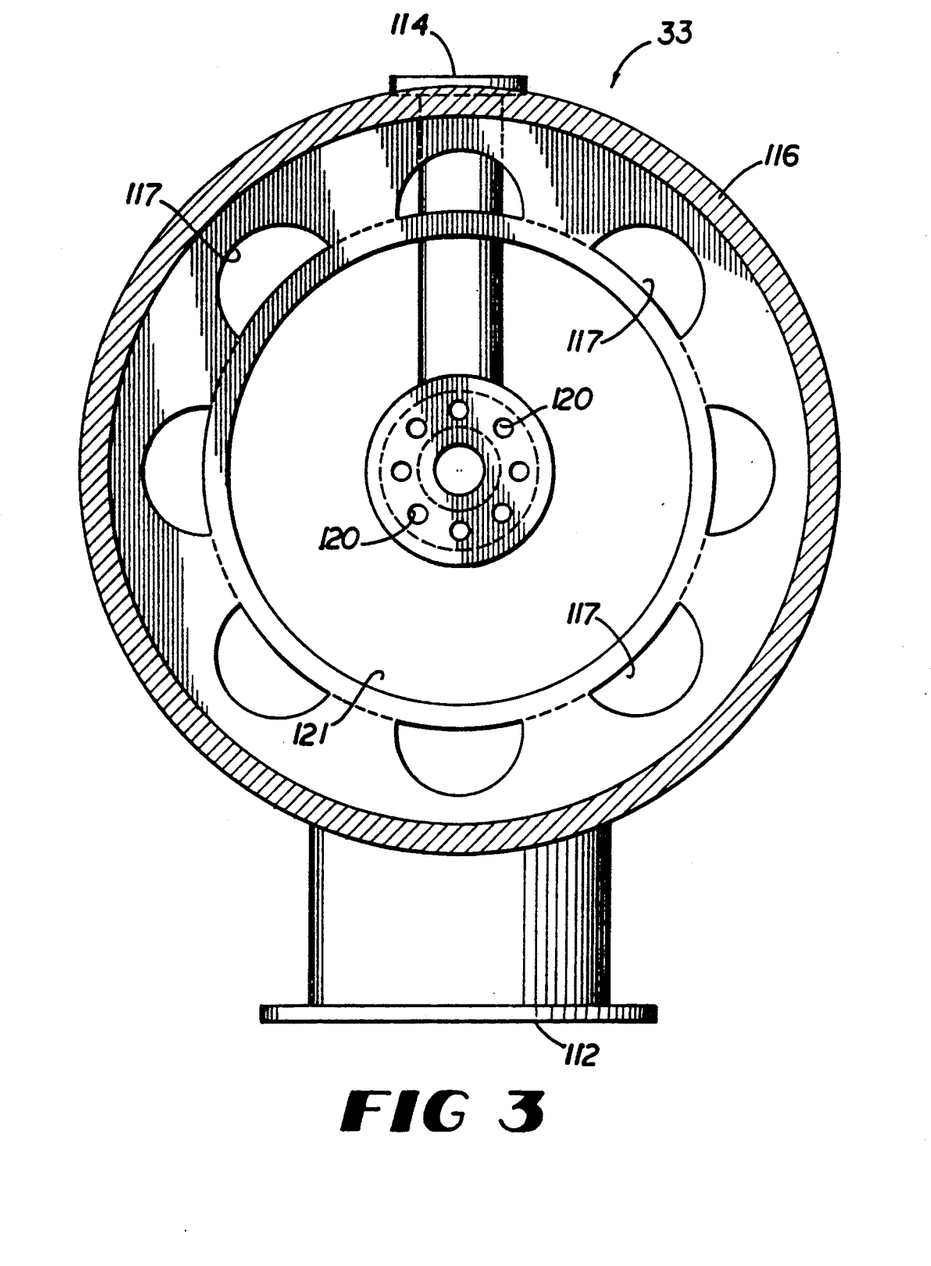
FIG. 3 is a cross-sectional view taken along lines 3—3 in FIG. 2.

A preferable embodiment of a combustor 33, as shown in FIGS. 2 and 3, comprises a fume inlet 111, a secondary oxidizer inlet 112, and a fuel inlet 113. Optionally, when a second oxidizer consists of two oxygen containing gases with different oxygen concentrations, for example, oxygen and air, oxygen and oxygen-enriched air, or air and oxygen-enriched air, an additional inlet 114 is used to produce secondary oxidizing gas to the combustor 33.

In the case where the secondary oxidizer is introduced inside of a combustor body 116 as a single stream, this oxidizer can be directed toward the flame envelope 118 being created by the mixing of this oxidizer with fuel and a fume stream without premixing with the fumes or it can be partially or completely introduced through at least one diluting opening 115 toward a stream of fume prior to the fume stream introduction in the flame envelope 118. When no or only partial premixing of a fume and the secondary oxidizer is taking place inside of the combustor body 116, a nozzle opening or plurality of openings 117 is arranged to direct the residual fraction of a secondary oxidizer toward the furnace interior to form a flame envelope 118.

Optionally, a secondary oxidizer consists of two oxidizing gases having different oxygen content and being separately delivered to the combustor. One or both of the oxidizing gases can be partially or completely premixed with the fumes inside of combustor body 116, using at least one opening 119 in addition to diluting opening 115. When the embodiment utilizes no or only a partial fraction of secondary oxidizer being introduced through opening 119 to mix with the fumes inside of the combustor body 116, one or more openings 120 are used to direct the residual fraction of the secondary oxidizing gas toward the furnace interior to form the flame envelope 118. When liquid fuel is used by combustor 33 an additional atomizing gas inlet is needed to supply atomizing gas, such as compressed air, or steam or oxygen to atomize the fuel. This inlet can be arranged in accordance with conventional state of the art techniques. The combustor 33 further has a furnace nozzle opening such as a plurality of openings 21 for directing the fume stream with or without secondary oxidizer being directed toward the furnace interior to form the flame envelope 118. The direction and dimension of nozzle openings 117, 120 and 121 should be arranged to provide for controlled mixing of fuel, oxidizer, and fumes to provide for desired flame heating characteristics and at the same time for the desired level of destruction of hazardous components of fumes inside of the flame envelope 118. It should be understood that combustor 33 can be designed with or without combustor 130 which provides for mixing inside of the chamber. When combustor 33 includes a combustion chamber 130, this chamber can be liquid cooled or refractory lined. The dimension of combustion chamber 130 when using liquid cooling depends on the specifics of operation of the industrial furnace 30.

OPERATION

During the operation, the solid waste is charged in primary incinerating chamber 1 through a solid waste feeder 3. The pace of charging is controlled by feeder control means 8 by communicating with process control means 19. The waste is transported throughout primary incinerating chamber 1 and decontaminated solid residue is discharged in solid residue receiver means 4. The auxiliary burner 2 is firing into a primary incinerating chamber interior to provide heat to the decontamination process. The controllable flow of fuel is delivered from a fuel supply line and further through flow control means 6 to the burner 2. The fuel can include clean and/or contaminated combustible material and can be introduced to the burner as single or multiple streams. The controllable flow of oxidizer is delivered from a supply source through flow control means 7 to the burner 2. The oxidizer can include combustion air and/or oxygen rich gas. When two different gases are used, they can be introduced to the burner as a single stream of oxygen enriched air or as two separate streams having different oxygen content. The firing rate of burner 2 is continuously controlled by process controls means 8 which control the flow of fuel supplied through flow control means 6 to the burner 2 based on one or more measured parameters arrived from temperature transducers 14 and/or 15 based on the pace of charging prescribed by process control means 8 and the level of negative pressure existing in the primary incinerating chamber being detected by pressure transducer 13. The firing rate of burner 2 also depends on other measured operational parameters of industrial furnace 30. Such parameters can be the value representing industrial furnace pressure, the firing rate of combustor 33 correlated with the process conditions in the industrial furnace, and other industrial process parameters correlating with the ability of the industrial furnace to accept the given fumes flow without diminishing product quality. The flow of primary oxidizers supplied to the burner 2 is also controlled by a process control means 8 via the flow control means 7. The flow of oxygen and nitrogen being delivered to the burner 2 with a primary oxidizer depends on one or more of the following parameters: the flow of primary fuel, the pace of charging, oxygen and/or CO content in flue gases detected by gas analyzers means 28, the level of negative pressure detected by pressure transducer 13, and other technological parameters correlated with the safe operation of a primary incinerating chamber and the desired level of decontamination of solid residue being discharged in a solid residue receiver 4. Optionally, when solid waste consists of a significant amount of combustible material, a controllable flow of the additional oxidizer is fed into the primary incinerating chamber 1 via injector means 11 and/or 12 through the flow control means 10 operated by process control means 8. The distribution of an additional oxidizer is to be optimized to provide for burnout of hazardous organics in a solid residue prior to a discharge from the primary incinerating chamber 1. Water and/or aqueous waste may be fed in an incinerating chamber interior via injector means 17. The distribution of aqueous injection between the front and back end of the chamber 1 is to be optimized to provide for desired temperature distribution along the chamber 1 and destruction of hazardous components of aqueous injection. The flow supplied to injector means 17 is also controlled via process control means 8.

To provide for minimization of fumes being discharged with exhaust gases leaving the primary incinerating chamber, oxygen rich oxidizing gas, such as pure oxygen or oxygen enriched air, can be used as a primary oxidizer and/or additional oxidizer. This oxygen rich gas can be used in many cases instead of air or together with air. The same make-up of oxidizing gas can be used for a secondary oxidizer and an additional oxidizer utilized in an industrial furnace. These oxidizers may be supplied as a mixture via one pipe line or as two separate streams via two separate pipe lines. When fumes consist of a substantial amount of airborne solid particles, an optional hot cyclone is installed to separate a major part of them from the fumes. Fumes from the exhaust gases are first directed throughout hot vortex 22. When fume gases are directed for co-processing into an industrial furnace with a limited ability to afterburn fumes, or when the level of combustibles in fumes are very high, or when thermally decontaminated waste by environmental regulations require the temperature and/or retention time of the afterburning process above the level achievable in an industrial furnace, these fumes are directed through an optional afterburning chamber 26. In afterburner chamber 26 operating similar to an afterburner chamber of a hazardous waste incinerator, the combustible components of fumes are oxidized to significantly reduce or practically eliminate their existence in flue gases leaving the afterburning chamber 26. The afterburner apparatus and method of operation can be designed in accordance with U.S. Pat. No. 4,861,262. When an industrial furnace is located substantially remote from the primary incinerating chamber or when the introduction of small particles which have not been separated from fumes by a hot cyclone are not desired in an industrial furnace, the optional scrubber 24 and venturi temperature conditioning means 27 are used. The fumes are directed first throughout venturi temperature conditioning means 27 and further through scrubber 24. When acid gases are to be scrubbed from fumes, NaOH or another reagent are introduced at the scrubber through inlet control means 18 to reduce the content of acid gases entering the industrial furnace. When optional baghouse 25 is used to further reduce particulates in fumes downstream of an industrial furnace, fumes are further directed throughout such baghouse 25 and then throughout fume moving means 36 creating a required suction pressure upstream and a discharge pressure downstream of the moving means 36. Said motive means 36 may use high pressure oxygen and/or air to educt fumes. This also provides for an increase in oxygen content of fumes reaching the industrial furnace. A high temperature exhaust fan can also be used as the moving means 36.

The operating condition of the primary incinerating chamber 1 significantly influences the volume and chemistry of the fumes being introduced into the flame generated by combustor 33. To provide the required heat flux to the industrial product being treated in the furnace 30 and at the same time to provide for the adequate level of thermal decontamination of fumes in the flame envelope of combustor 33, the proposed process control algorithm should preferably use a feedback communication link to a control means 8 controlling a solid waste feeding pace, the flow of fuel, and the primary oxidizer with information related to or correlated with a charging pace of industrial furnace 30.

This feedback information should be used to adjust the process parameters of the primary incinerating chamber 1 to provide a reduced fume volume when the heat input required by the industrial furnace is temporary reduced. It is also desired for the control means 9 to use the feed-forward control algorithm when the signal correlated with the volume of fume being produced in the primary chamber is fed from control means 8 to control means 9. This feed-forward signal can preferably be used to adjust the charging pace of industrial material being charged in furnace 30 where an excessive volume of fumes is temporary generated in incinerating chamber 1.

To control the total volume of exhaust gases discharging from the furnace, this feedback feed-forward control algorithm can be used to adjust the flow of nitrogen being introduced into the primary incinerating chamber and/or industrial furnace with a primary and/or secondary oxidizer. This adjustment can be provided through controlling of a share of oxygen being supplied with oxygen-rich gas vs. oxygen-leaner gas participating as a part of the primary and/or secondary oxidizer.

Another signal representing the excessive pressure threatening the leakage of the fumes into the environment can be fed from control means 8 to 9 and in the opposite direction so that feed rates and/or firing rates and/or nitrogen participation in one or both oxidizers can be adjusted to prevent or minimize such leakage.

When water and/or an aqueous waste stream is used for temperature reduction, the control of flow being injected can also be affected as a result of communication between means 8 and 9. For example, temporary reduction of a throughput pace in an industrial furnace can trigger the increase in water injection in a primary chamber to slow down waste burning and reduce the temperature, therefore, reducing the actual volume of fumes leaving the primary incinerating chamber.

It should also be understood that control means 8 is involved in the control of process parameters of the primary incinerating chamber 1 and control means 9 involved in the control of process parameters of industrial furnace 30. Both of these control means may actually exist as a part of the program of a single process control means.

Additionally, it should be understood that an industrial furnace can be designed in many different ways including an industrial boiler wherein $H_2O$ is used as an industrial material to be heated to produce steam.

Furthermore, it should be understood that the afterburner, scrubber, baghouse, or other components of the process hardware involved in processing fumes and flue gases leaving the industrial furnace may send and receive process signals from control means 8 and 9. These signals will actively be used to adjust process parameters of the primary chamber 1, the industrial furnace 30, and the process parameters of said components.

While the above description contains many specificities, these should not be construed as limitations on the scope of the invention but rather as an application of preferred embodiments thereof.

What is claimed is:

1. A method of thermal decontamination of organic wastes comprising the steps of:
   a) directing waste material into a primary incinerating chamber;
   b) providing in said primary incinerating chamber a controllable amount of heat communicating with said waste material and a flow of a primary oxidizer communicating with said waste material;
   c) thermally decontaminating said waste material in said primary incinerating chamber to produce decontaminated solid residue and exhaust fumes;
   d) directing said exhaust fumes to an industrial thermal process containment means having a combustor means to produce industrial product;
   e) supplying controllable amount of fuel to said combustor means;
   f) supplying to said industrial containment means a secondary oxidizer at least part of which has oxygen content above 21%;
   g) directing at least part of said fuel, at least part of said secondary oxidizer, and at least part of said exhaust fumes to mix in a flame to thermally decontaminate said exhaust fumes generating secondary combustion gases;
   h) providing a heat flux from said secondary combustion gases to the industrial product.

2. The method of claim 1, and further comprising:
   a) sensing at least one primary process parameter in said primary incinerating chamber and generating at least one primary signal indicative of the level of thermal decontamination of said solid residue;
   b) first comparing said sensed process parameter with a predetermined value of said primary process parameter which is required to maintain an environmentally acceptable level of decontamination and communicating the result of said first comparison to means for controlling said controllable amount of heat being provided to said primary incinerating chamber;
   c) sensing at least one secondary process parameter of said industrial thermal process indicative of the quality of said industrial product; and
   d) second comparing said sensed process parameter with a predetermined value of said secondary process parameter which is required to maintain a desired industrial product quality and communicating the result of said second comparison to a means for controlling the flow of at least part of said fuel or at least part of said secondary oxidizer provided to said industrial containment means.

3. The method of claim 2, and further comprising:
   a) sensing at least one process parameter correlated to the process pressure;

b) third comparing said process pressure correlating parameter with a predetermined value of said process pressure correlating parameter which is required to prevent contaminated exhaust fume leakage in the environment and communicating the result of said third comparison to means responsible for the directing of solid waste into said primary incinerating chamber.

4. The method of claim 1, which further comprises the step of afterburning of said exhaust fumes inside of an afterburning chamber located downstream of said primary incinerating chamber and upstream of said industrial thermal process containment means.

5. The method of claim 1, which further comprises the step of separating at least part of the solid particles contained in said exhaust fumes in separating means located downstream of said primary incinerating chamber and upstream of said industrial thermal process containment means.

6. The method of claim 1, which further comprises the step of scrubbing acid gas constituents of said exhaust fumes in scrubbing means located downstream of said primary incinerating chamber and upstream of said industrial thermal process containment means.

7. The method of claim 1, and further comprising the step of injecting water or other quenching agent to mix with said exhaust fumes to condition the temperature of said exhaust fumes inside of temperature conditioning means located downstream of said primary incinerating chamber and upstream of said industrial thermal process containment means.

8. The method of claim 1, and further comprising the step of simultaneously maintaining negative pressure of exhaust fumes downstream of said primary incinerating chamber.

9. The method of claim 1, wherein said step of providing a controllable amount of heat comprises firing a primary burner and directing its products of combustion into said primary incinerating chamber utilizing at least a part of said primary oxidizer.

10. The method of claim 1, wherein said step of supplying a secondary oxidizer comprises the step of providing at least a part of said secondary oxidizer to be mixed with said exhaust fumes upstream of said industrial containment means.

11. The method of claim 1 which further comprises the step of measuring the oxygen content in exhaust gases discharged from said industrial containment mans and the step of changing the amount of oxygen being supplied with at least one of said oxidizers to control said oxygen content at a desired level.

12. The method of claim 1, further comprising the stage of discharging exhaust gases from said industrial containment means and further directing said exhaust gases into pollution control means responsible for reducing the level of air emissions to environmentally acceptable levels prior to discharge into the atmosphere.

13. The method of claim 1, which further comprises the step of measuring the oxygen content in said exhaust fumes upstream of said industrial containment means and the step of changing the amount of oxygen being supplied with at least one of said oxidizers.

14. The method of claim 1, wherein said primary oxidizer contains a gas stream with oxygen content above 21%.

15. The method of claim 1, wherein said controllable amount of heat is supplied by an electrical heating means.

16. The method of claim 3, and further comprising the step of communicating the result of said third comparison to means responsible for providing a controllable flow of said at least part of said secondary oxidizer to control the amount of nitrogen and oxygen being provided with said oxidizers to the process.

17. The method of claim 10, wherein said step of supplying a secondary oxidizer comprises a step of providing at least a part of said secondary oxidizer to be mixed with said exhaust fumes upstream of said industrial containment means.

18. The method of claim 10, which further comprises the step of measuring the oxygen content in said exhaust gases from said industrial containment means and the step of changing the amount of oxygen being supplied with at least one of said oxidizers to control said oxygen content at a desired level.

19. The method of claim 10, which further comprises the step of measuring the oxygen content in said exhaust fumes upstream of said industrial containment means and the step of changing the amount of oxygen being supplied with at least one of said oxidizers.

20. The method of claim 10, wherein said primary oxidizer contains a gas stream with oxygen content above 21%.

* * * * *